(12) United States Patent
Hart et al.

(10) Patent No.: US 7,596,461 B2
(45) Date of Patent: Sep. 29, 2009

(54) MEASUREMENT OF AIR QUALITY IN WIRELESS NETWORKS

(75) Inventors: Brian Donald Hart, Sunnyvale, CA (US); Christopher Sean Johnson, San Jose, CA (US); Igal Gutkin, Redwood City, CA (US); Sanjeev Hemantkumar Desai, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/774,362

(22) Filed: Jul. 6, 2007

(65) Prior Publication Data

US 2009/0012738 A1 Jan. 8, 2009

(51) Int. Cl.
G06F 19/00 (2006.01)
G06F 17/40 (2006.01)

(52) U.S. Cl. .......................... 702/69; 375/224; 375/227; 455/226.2; 702/57; 702/66; 702/182; 702/187; 702/189

(58) Field of Classification Search ................ 73/432.1; 324/76.11, 158.1; 375/224, 227; 455/226.1, 455/226.2, 226.3; 702/1, 57, 64, 66, 69, 702/81, 85, 104, 108, 111, 116, 127, 182, 702/187, 188, 189
See application file for complete search history.

(56) References Cited

U.S. PATENT DOCUMENTS

| | | | | |
|---|---|---|---|---|
| 2,694,142 A | * | 11/1954 | Laidig | .................... 455/226.3 |
| 2,996,613 A | * | 8/1961 | Glomb | ........................ 329/311 |
| 3,176,070 A | * | 3/1965 | Rumble | .................... 178/69 R |
| 3,435,345 A | * | 3/1969 | Ashby | ...................... 324/76.13 |
| 4,839,582 A | | 6/1989 | Fukaya et al. | |
| 5,023,900 A | | 6/1991 | Tayloe et al. | |
| 5,077,753 A | | 12/1991 | Grau, Jr. et al. | |
| 5,093,927 A | | 3/1992 | Shanley | |
| 5,125,108 A | * | 6/1992 | Talwar | .................... 455/278.1 |
| 5,210,771 A | | 5/1993 | Schaeffer et al. | |
| 5,220,564 A | | 6/1993 | Tuch et al. | |
| 5,412,687 A | | 5/1995 | Sutton et al. | |
| 5,452,319 A | | 9/1995 | Cook et al. | |

(Continued)

FOREIGN PATENT DOCUMENTS

WO WO0057658 9/2000

(Continued)

OTHER PUBLICATIONS

International Standard, ISO/IEC 8802-11 ANSI/IEEE Std. 802.11, 1999 Edition, Part II: Wireless LAN Medium Access Control (MAC) and Physical Layer (PHY) specifications, pp. 122-137.

(Continued)

Primary Examiner—Edward R Cosimano
(74) Attorney, Agent, or Firm—Tucker Ellis & West LLP

(57) ABSTRACT

A system for measuring air quality in wireless networks. In particular implementations, a method includes computing an interference severity level for a plurality of interference sources detected at an access point; aggregating one or more of the computed interference severity levels relative to the access point; and computing an air quality metric for the access point, wherein the air quality metric based at least in part on an equation: 1—aggregated interference severity level.

31 Claims, 4 Drawing Sheets

U.S. PATENT DOCUMENTS

| | | | |
|---|---|---|---|
| 5,469,471 A * | 11/1995 | Wheatley, III | 370/335 |
| 5,491,692 A | 2/1996 | Gunner et al. | |
| 5,541,954 A | 7/1996 | Emi | |
| D375,297 S | 11/1996 | Casarez et al. | |
| 5,603,088 A * | 2/1997 | Gorday et al. | 455/67.13 |
| 5,621,767 A | 4/1997 | Brandt et al. | |
| 5,668,828 A | 9/1997 | Sanderford, Jr. et al. | |
| 5,684,860 A | 11/1997 | Milani et al. | |
| 5,697,056 A * | 12/1997 | Tayloe | 455/513 |
| 5,697,059 A | 12/1997 | Carney | |
| 5,710,795 A | 1/1998 | Tsumura | |
| 5,774,785 A * | 6/1998 | Karlsson | 455/522 |
| 5,774,808 A | 6/1998 | Sarkioja et al. | |
| 5,809,059 A | 9/1998 | Souissi et al. | |
| 5,844,936 A | 12/1998 | Lesthievent | |
| 5,889,768 A | 3/1999 | Storm et al. | |
| 5,940,384 A | 8/1999 | Carney et al. | |
| 5,950,124 A | 9/1999 | Trompower et al. | |
| 5,995,844 A | 11/1999 | Fukuda | |
| 6,032,046 A | 2/2000 | Nakano | |
| 6,069,871 A | 5/2000 | Sharma et al. | |
| 6,097,956 A | 8/2000 | Veeravalli et al. | |
| 6,104,928 A | 8/2000 | Waugh | |
| 6,137,994 A * | 10/2000 | Alterman et al. | 455/69 |
| 6,178,329 B1 | 1/2001 | Chao et al. | |
| 6,195,554 B1 | 2/2001 | H'mimy et al. | |
| 6,208,629 B1 | 3/2001 | Jaszewski et al. | |
| 6,208,836 B1 | 3/2001 | Moraes | |
| 6,223,028 B1 | 4/2001 | Chang et al. | |
| 6,240,077 B1 | 5/2001 | Vuong et al. | |
| 6,243,413 B1 | 6/2001 | Beukema | |
| 6,286,038 B1 | 9/2001 | Reichmeyer et al. | |
| 6,418,317 B1 | 7/2002 | Cuffaro et al. | |
| 6,473,038 B2 | 10/2002 | Patwari et al. | |
| 6,693,884 B1 | 2/2004 | Gutowski et al. | 370/335 |
| 6,788,658 B1 | 9/2004 | Bims | |
| 6,799,047 B1 | 9/2004 | Bahl et al. | |
| 6,810,428 B1 | 10/2004 | Larsen et al. | |
| 6,917,819 B2 | 7/2005 | Collins | |
| 6,925,069 B2 | 8/2005 | Koos et al. | |
| 7,024,162 B2 * | 4/2006 | Muthuswamy et al. | 455/67.11 |
| 7,107,032 B2 | 9/2006 | Li | |
| 7,444,145 B2 | 10/2008 | Diener | |
| 2002/0151318 A1 * | 10/2002 | Kline et al. | 455/513 |
| 2002/0188723 A1 | 12/2002 | Choi et al. | |
| 2002/0194384 A1 | 12/2002 | Habetha | |
| 2003/0023746 A1 | 1/2003 | Loguinov | |
| 2003/0107512 A1 | 6/2003 | McFarland et al. | |
| 2003/0188006 A1 | 10/2003 | Bard | |
| 2003/0198208 A1 | 10/2003 | Koos et al. | |
| 2003/0206130 A1 | 11/2003 | Husted et al. | |
| 2003/0224787 A1 | 12/2003 | Gandolfo | |
| 2004/0111607 A1 | 6/2004 | Yellepeddy | |
| 2004/0132411 A1 | 7/2004 | Li | |
| 2004/0151137 A1 | 8/2004 | McFarland et al. | |
| 2004/0156336 A1 | 8/2004 | McFarland et al. | |
| 2004/0157580 A1 | 8/2004 | Stadelmeier et al. | |
| 2004/0192290 A1 * | 9/2004 | Muthuswamy et al. | 455/425 |
| 2005/0059363 A1 | 3/2005 | Hansen | |
| 2005/0059364 A1 | 3/2005 | Hansen et al. | |
| 2006/0291401 A1 | 12/2006 | Yuen et al. | 370/252 |
| 2007/0004394 A1 | 1/2007 | Chu et al. | |
| 2007/0049319 A1 | 3/2007 | Hart et al. | 455/522 |
| 2008/0009244 A1 * | 1/2008 | Lee | 455/69 |

FOREIGN PATENT DOCUMENTS

| | | |
|---|---|---|
| WO | WO 02/082844 | 10/2002 |

OTHER PUBLICATIONS

"tcp-masq" Internet citation http://speed.cis.nctu.edu.tw/bandwith/opensource/, Daa Sheet Cisco Aironet 1200 Series Access Point, pp. 1-13, posted Mar. 11, 2002.

Autocell Self-Organizing WLANs, Propagate Networks, 4 pages.

HotPoint 1000R Outdoor Wireless Mesh Router, firetide wireless instant networks, 2 pages; 2003-2004.

wi-fiplanet.com/news/article.php/2219011, Propagate's Embedded Software Calibrates WLANs, Jul. 21, 2004, pp. 1 and 2.

wi-fiplanet.com/news/article.php/3078631, FireTide Shows Off Mesh Router, Jul. 21, 2004, pp. 1 and 2.

* cited by examiner

MEASUREMENT OF AIR QUALITY IN WIRELESS NETWORKS

TECHNICAL FIELD

This disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Many wireless networks utilize a contention-based media access scheme (such as the Carrier Sense Multiple Access with Collision Avoidance (CSMA/CA), and Enhanced Distributed Controlled Access (EDCA)). Accordingly, radio interference may adversely affect throughput. Non-wireless fidelity (Wi-Fi) interference affects the performance of a wireless network by degrading the ability of the wireless network to communicate reliably. Interference detection technology may provide some interference metrics such as received signal strength indicator (RSSI) and duty cycle values. Existing interference detection systems typically provide these metrics at a local level (e.g., point metrics at an access point). Some systems may also identify the type of non-Wi-Fi interference sources, such as microwave ovens, Bluetooth, cordless telephones, etc.

DESCRIPTION OF EXAMPLE EMBODIMENTS

A. Overview

Particular implementations facilitate characterization of the effect of interference in wireless network deployments by aggregating the effects of interference at different conceptual levels of a wireless network. According to one implementation, an interference level may be computed for a given access point or group of access points in a target region. In one implementation, a target, region may be a physical area (e.g., floor or wing of a building, a building, a campus, etc.) that may experience interference from one or more interference sources (e.g., microwave ovens, Bluetooth, cordless telephones, etc.). A WLAN management server computes interference severity level metrics associated with one or more access points. The interference severity level metrics may include an interference severity level at a given channel of an access point, an interference severity level for all interference sources per channel at the access point, an interference severity level for the serving channel of the access point, and an air quality level at the access point. In one implementation, the WLAN management server may compute the air quality level for a given access point by aggregating the interference severity levels of all interference sources of all of the channels in a given band. In one implementation, the WLAN management server may aggregate air quality metrics for multiple access points to generate air quality metrics for various target areas. In one implementation, the management server may apply one or more policies based on air quality metrics at one or more target areas. In one implementation, the management server may display interference severity metrics including air quality metrics at these various target areas to provide a "health" indicator associated with these target areas to a user so that the user may monitor the wireless network and investigate potential problem areas.

B. Example Wireless Network System Architecture

B.1. Network Topology

Figure 1:
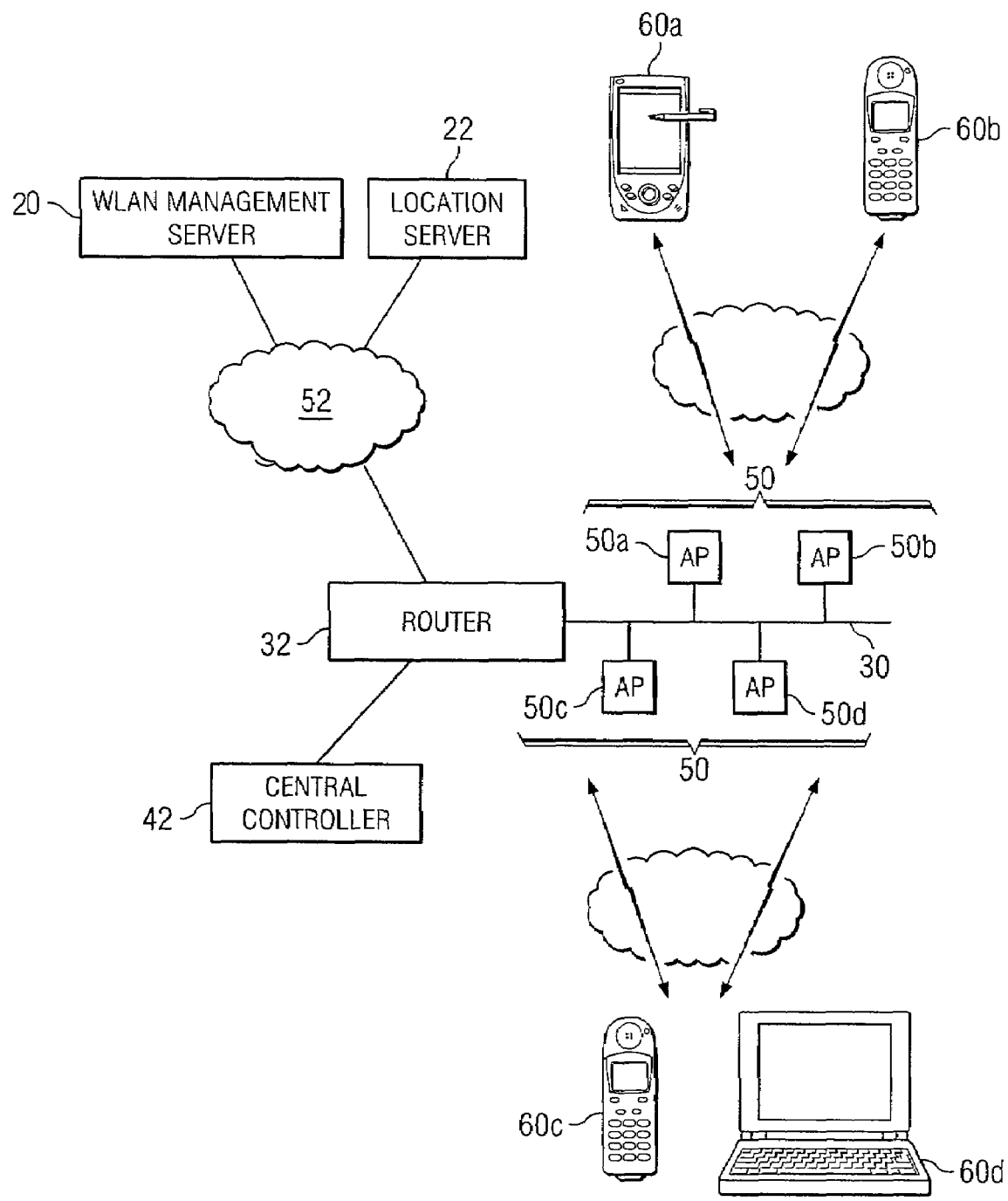
FIG. 1 illustrates example components in a wireless local area network (WLAN) system.

FIG. 1 illustrates example components in a wireless local area network (WLAN) system. In a specific embodiment of the present invention, the system includes a WLAN management server 20, a location server 22, and a central controller 42, a local area network (LAN) 30, a router 32, and wireless access points 50, illustrated as 50a, 50b, 50c, and 50d. LAN 30 is implemented by a switch (or an array of switches) and/or other network devices, such as a bridge.

As FIG. 1 illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links. Network 52 could also he a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1 illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or light-weight wireless access points operating in connection with a wireless switch (not illustrated). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

In particular implementations, one or more of the wireless access points 50 may detect interference by periodically monitoring for interference on one or more operating channels (e.g., its active channel). A wireless access point 50 may measure and collect interference data in different modes. For example, in a local mode, a wireless access point 50 may periodically monitor its active channel using a relatively small duty cycle. In a monitor mode, a wireless access point 50 may monitor all available operating channels. In some implementations, the wireless access points 50 may collect information on various attributes of detected sources of interference to determine the type of interference (e.g., microwave, cellular phone, etc.) by comparing the attributes against a set of interference signatures. In one implementation, a given interference signature may be based on observed radio frequency attributes such as received signals strength, duty cycle, power, on time, frequency, etc. In particular implementations, interference signatures may identify individual interference sources and optionally types and locations of individual interference sources.

B.2. WLAN Management Server

Figure 2:
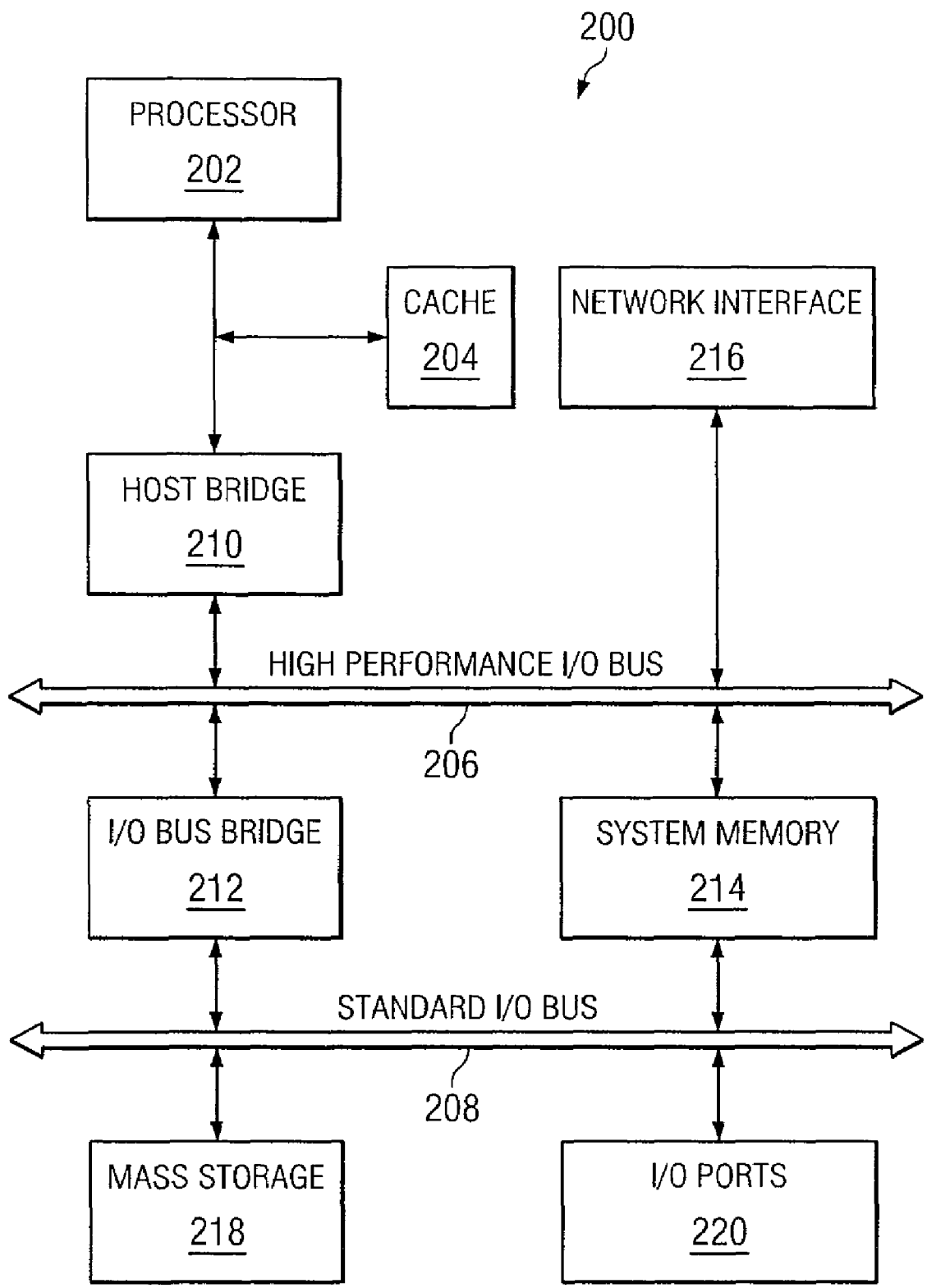
FIG. 2 illustrates an example hardware system, which may be used to implement a WLAN management server.

FIG. 2 illustrates an example hardware system 200, which may be used to implement a WLAN management server 20. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the WLAN management server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

C. Core Metrics Used for Characterizing Interference Severity Levels

The WLAN management sewer 20 may characterize the air quality of a wireless network by gathering core metrics at the access point level. The interference severity level, at the access point level, may be characterized in a variety of ways.

In one implementation, the interference severity level may be based on duty cycle and RSSI metrics. For example, in one implementation, the interference severity level (S) of a given interference source (i) at a particular channel (j) of a given access point (k) may be computed according to the following equation:

$$S\;(\text{interferer}\_i, \text{channel}\_j, ap\_k) = \text{Duty Cycle (interferer}\_i, \text{channel}\_j, ap\_k)*RSSI\;(\text{interferer}\_i, \text{channel}\_j, ap\_k) > \text{thresh, where thresh}=-82\;\text{or}\;-85\;\text{dBm. If}\;RSSI<\text{thresh},\;S=0.$$

In another implementation, the interference severity level may be based on a weighted RSSI function and a modified duty cycle function. For example, in one implementation, the interference severity level (S) may be computed according to the following equation:

$$S(\text{Interferer}\_i,\;\text{channel}\_j, ap\_k) = W(RSSIijk)*DC2ijk,$$

where RSSIijk is a shorthand notation for RSSI (interferer_i, channel_j, ap_k).

In one implementation, the W(RSSI) may be represented by a value between 0 and 1. For example, in one implementation, $W(RSSIijk)=\frac{1}{32}$ if $RSSIijk<=-93$ dBm. In one implementation, if the received signal strength is between the lower (−93 dBm) and an upper (−62 dBm) threshold dB values, the W(RSSI) value may be a monotonic non-decreasing function (linear, non-linear, ramp, step function, etc.). For example, in one implementation, W (RSSIijk)=1/32+1/32*(RSSIijk+93) if −93 dBm<=RSSIijk<=−62 dBm. If the received signal strength is above the higher threshold dB, the W(RSSI) value=1. For example, W (RSSIijk)=1 if RSSIijk>=−62 dBm. This implementation may be considered a "soft" step, because the 802.11ag clear channel assessment (CCA) threshold for non-Wi-Fi is undefined (but often is −62 dBm). From the access point viewpoint, the interference source may be seen stronger or weaker at nearby clients.

In one implementation, the duty cycle may be defined as a percentage of the on time portion of a period or repeating time interval, where the on time is the time that the interference source is active. For example, in one implementation, the modified duty cycle function (DC2$ijk$) of a given interference source (i) at a particular channel (j) of a given access point (k) may be computed according to the following equation:

$$DC2ijk = \min(DCijk * \max(1, 400\, us/PDijk), 1),$$

where DCijk=Duty Cycle (interferer_i,channel_j,ap_k), and PDijk=average pulse duration of ith interferer on jth channel at the kth access point. In one implementation, PD is the pulse duration (e.g., on time only). In one implementation, the duty cycle and pulse duration remain the same on different channels (while the RSSI changes).

In one implementation, the "max (1, 400 us/PDijk)" factor elongates any short pulses up to 400 us and does not affect longer pulses. The rationale is that any short pulse may corrupt a Wi-Fi packet. In one implementation, 400 us is longer than a typical length of an 802.11ag packet+ACK, and 400 is shorter than a typical 802.11b packet+ACK. In one implementation, there may be different definitions by band.

In particular implementations, the WLAN management sewer 20 may compute a total severity for a given access point due to all interference sources according to the following equation:

$$S(\text{channel\_j, ap\_k}) = \sum_{i=1}^{I} S(\text{interferer\_i, channel\_j, ap\_k}),$$

where I equals the number of detected interference sources relative to a given access point (k) and operating channel (j). In addition, WLAN management server 20 may compute air quality metrics, such as serving channel and average channel air quality according to the equation: AQ=1−S. For example, an access point typically operates on a single operating channel (serving channel) at any given time. Accordingly, it may be desirable to compute air quality metrics, for an access point, relative to the serving channel. As discussed above, Air Quality (AQ) can be defined as 1−S. Accordingly, an AQ metric for the serving channel (SCAQ) can be defined as:

$$SCAQ(\text{ap\_k}) = 1 - \sum_{j=1}^{J} S(\text{channel\_j, ap\_k}) * \text{delta}(\text{channel\_j, channel\_ap\_k}),$$

where delta_(a,b) is defined to be the indicator function (i.e., delta(a,b) equals 1 if a=b and 0 if a does not equal b). Thus the sum is really just a selection of the AQ on the AP's serving channel. Still further, an average air quality metric (AAQ) for all available operating channels can be computed as follows:

As well, an AP could be on any channel, so we have average AQ:

$$AAQ(\text{ap\_k}) = 1 - 1 - 1/J * \sum_{j=1}^{J} S(\text{channel\_j, ap\_k}).$$

In one implementation, the WLAN management server 20 may perform these calculations per band.

Figure 3:
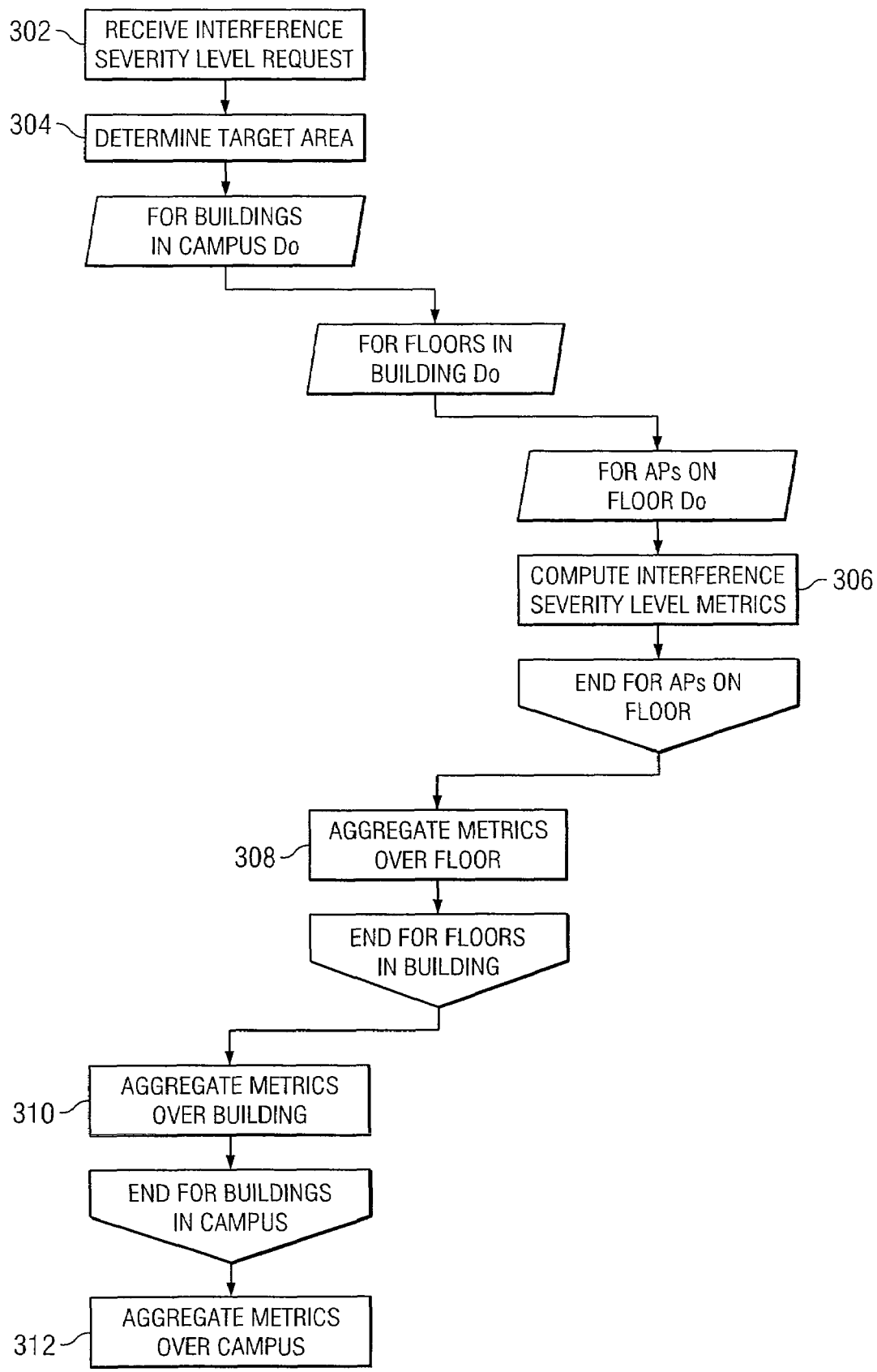
FIG. 3 illustrates an example process flow implemented at the WLAN management server.
Figure 4:
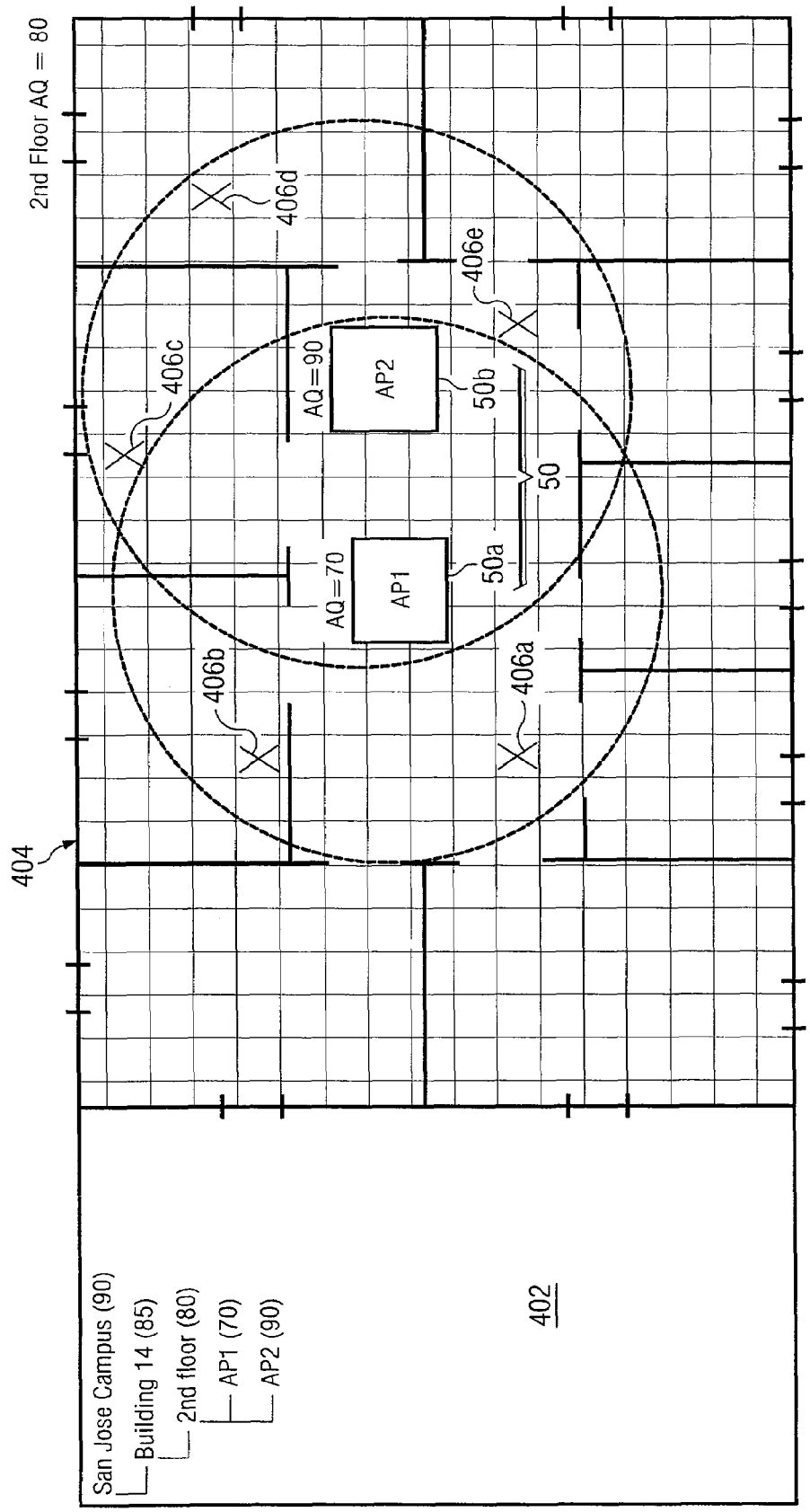
FIG. 4 shows an example user interface UI in accordance with one embodiment.

FIG. 3 illustrates an example process flow implemented at the WLAN management server 20. As FIG. 3 shows, the WLAN management server 20 receives an interference severity level or air quality request (302). The WLAN management server 20 then determines a target area for the requested interference severity level (304). In the following, since interference severity level and air quality are opposite terms relating to the same underlying issue, "interference severity level" in the following may also be interpreted as relating to Air Quality, and vice versa. For example, in particular implementations, the target region may include a single access point or a group of access points on a portion of one or more floors of a building, a building, a campus, etc. In one implementation, the target area may be included in the request. FIG. 3 illustrates a set of nested loop operations that are conditionally performed depending on the target region identified in the request. For example, as FIG. 3 illustrates, WLAN management server 20 may compute metrics for a single access point. In addition, to compute metrics on a floor or building level, air quality metrics (such as serving channel or average air quality metrics) may be individually computed for each access point and then aggregated (e.g., averaged) for a plurality of access points that correspond to the designated target region. As FIG. 4 illustrates, the metrics may be displayed at various conceptual levels, such as individual access points and aggregate metrics for floors, buildings, and campuses.

In one implementation, if the target area is associated with a single access point, the WLAN management server 20 computes interference severity level metrics associated with the access point (306). The WLAN management server 20 identifies one or more interference sources associated with the access point. In one implementation, if interference profiling is employed to identify interference sources, the signal strength data collected at the access points may be passed to the location server 22, which may determine the location of the interference sources. The computed locations may be rendered on a map of a physical space or otherwise provided to a network administrator.

As FIG. 3 provided, the WLAN management, server 20 may compute the air quality level at various conceptual levels corresponding to groups of access points by aggregating (e.g., averaging) the interference severity levels computed for respective access points. In one implementation, if the target area is a floor, the WLAN management server 20 computes interference severity level metrics for each access point on the floor, as described above, and then aggregates the interference levels associated with all of the access points on the floor (308). To aggregate the metrics, the WLAN management server 20 may average the metrics computed for each access point. In one implementation, the target area may include a group of access points located on multiple floors or on portions of one or more floors. As such, the WLAN management server 20 aggregates the interference levels of each of the access points on the selected floors or portion of the selected floors. In one implementation, the WLAN management server 20 may average of all of the air qualities of the serving channels of the access points on the floors.

In one implementation, the WLAN management server 20 may compute the service channel air quality (SCAQ) of a given floor (m) according to the following equation:

$$SCAQ\,(floor\_m)=1/K*sum\_over\_ap\_k\,on\,floor\_m\,SCAQ\,(ap\_k),$$

where K is the number of access points on the floor.

In one implementation, the WLAN management server 20 may compute the average air quality (AAQ) of a given floor (m) according to the following equation:

$$AAQ\,(floor\_m)=1/K*sum\_over\_ap\_k\,on\,floor\_m\,AAQ(ap\_k),\text{ where } K \text{ is the number of access points on the floor.}$$

Similarly, in particular implementations, if the target area is a building, the WLAN management server 20 computes the air quality metrics for each floor in the building, and then aggregates the those air quality metrics for the building (310). In one implementations, the WLAN management server 20 computes air quality metrics associated with each subgroups (e.g., each floor of the budding) and then averages those air quality metrics for a larger target, area (e.g., the building). Alternatively, in particular implementations, the WLAN management server 20 may aggregate the air quality metrics of all of the access points in the building.

In one implementation, the WLAN management server 20 may compute the service channel air quality (SCAQ) of a given building (n) according to the following equation:

$$SCAQ\,(building\_n)=1/M*sum\_over\_floor\_m\,in\,building\_n\,SCAQ(floor\_m),$$

where M is the number of floors in the building.

In one implementation, the WLAN management server 20 may compute the average air quality (AAQ) of a building (n) according the following equation:

$$AAQ\,(building\_n)=1/M*sum\_over\_floor\_m\,in\,building\_n\,AAQ(floor\_m).$$

In one implementation, if the target area is a campus, the WLAN management server 20 aggregates the air quality metrics over the campus (312). In one implementation, the WLAN management server 20 computes air quality metrics for each building in the campus, and then aggregates those air quality metrics for the campus. Alternatively, in particular implementations, the WLAN management server 20 may aggregate the air quality metrics of all of the access points in the campus. Also could aggregate floor AQ directly to campus AQ.

In one implementation, the WLAN management server 20 may compute the service channel air quality (SCAQ) of a given campus (p) according to the following equation:

$$SCAQ(campus\_p)=1/N*sum\_over\,building\_n\,in\,campus\_p\,SCAQ(building\_n),$$

where N is the number of buildings in the campus.

In one implementation, the WLAN management server 20 may compute the average air quality (AAQ) of a given campus (p) according to the following equation:

$$AAQ(campus\_p)=1/N*sum\_over\,building\_n\,in\,campus\_p\,AAQ(building\_n).$$

In one implementation, these values computed above may be proportions that may be converted to percentages by multiplying them by 100.

D. User Interface for Displaying Air Quality Levels

FIG. 4 shows an example user interface in accordance with one embodiment. FIG. 4 shows an example hierarchical tree view 402 that displays air quality levels at different target areas and an example target area view 404. In this particular example, the tree view 402 displays the air quality level at a particular campus (e.g., San Jose Campus), building (e.g., Building 14), floor (2nd floor), and access points (e.g., access points 50, illustrated as AP1 50a and AP2 50b). In this particular example, the particular target's area view 404 displays a floor (e.g., 2nd floor), and the access points on that floor (e.g., AP1 50a and AP2 50b). In one implementation, the target area view 404 also may display some of the air quality levels corresponding to those in the tree view 402. In one implementation, the target area view 404 may display the interference sources 406a, 406b, 406c, 406d, and 406e.

E. Policies

In one implementation, the WLAN management server 20 may apply one or more policies based on the resulting severity or air quality metrics. Such policies may involve manual or automatic mitigation of interference. For example, if one or more interference levels or the air quality of one or more target areas exceed or fall below a predetermined threshold, WLAN management server 20 may notify an administrator of the interference level and/or air quality (e.g., air quality is below 60%). In one implementation, the notification may be a contained in an email. In another implementation, the notification may be an indication (e.g., color-coded indicator) on a user interface such as that of FIG. 4. Based on the notification, the administrator may investigate the potential problem areas and respond accordingly. In some implementations, the WLAN management server 20 may automatically reconfigure aspects of the wireless network.

In particular implementations trigger severity levels may be based on any one or more of the interference severity metrics described above. For example, in one implementation, a trigger level may be based on a threshold air quality level. In one implementation, a trigger level may be based on a threshold air quality level at a particular target area (e.g., floor or wing of a building) or at a serving channel at a particular access point. For example, if the serving channel air quality metric for a floor falls below a threshold level, this could trigger WLAN management server 20 to automatically recompute channel assignments for the access points on the floor, or to transmit messages to the access points causing them to re-initialize a channel assignment algorithm performed locally relative to the access points. Various notification and other policies may be useful in private as well as public Wi-Fi deployments.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited by the embodiments described above.

What is claimed is:

1. One or more tangible computer readable media encoded with software, the software comprising computer-readable instructions operable, when executed, to cause one or more processors to:

compute an interference severity level for a plurality of interference sources detected at an access point;

aggregate one or more of the computed interference severity levels relative to the access point; and compute an air quality metric for the access point, wherein the air quality metric is based at least in part on an equation 1 minus aggregated interference severity level.

2. The tangible computer readable media of claim 1 wherein the software further comprises computer-readable instructions operable, when executed, to cause the one or more processors to: compute an interference severity level of an operating channel relative to the access point.

3. The tangible computer readable media of claim 1 wherein the software further comprises computer-readable instructions operable, when executed, to cause the one or more processors to:
compute an interference severity level of an operating channel relative to each access point of a plurality of access points;
aggregate, across one or more floors, the computed interference severity levels of the operating channels; and
compute an air quality metric for the one or more floors, wherein the air quality metric is based at least in part on the equation 1 minus aggregated interference severity level.

4. The tangible computer readable media of claim 1 wherein the software further comprises computer-readable instructions operable, when executed, to cause the one or more processors to:
compute an interference severity level of an operating channel relative to each access point of a plurality of access points;
aggregate, across one or more floors, the computed interference severity levels of the operating channels;
aggregate, across one or more buildings, the computed aggregation interference severity levels of the operating channels across the one or more floors; and
compute an air quality metric for the one or more buildings, wherein the air quality metric is based at least in part on the equation 1 minus aggregated interference severity level.

5. The tangible computer readable media of claim 1 wherein the software further comprises computer-readable instructions operable, when executed, to cause the one or more processors to:
compute an interference severity level of an operating channel relative to each access point of a plurality of access points;
aggregate, across one or more floors, the computed interference severity levels of the operating channels;
aggregate, across one or more buildings, the computed aggregation interference severity levels of the operating channels across the one or more floors;
aggregate, across one or more campuses, the computed aggregation interference severity levels of the operating channels across the one or more buildings; and
compute an air quality metric for the one or more campuses, wherein the air quality metric is based at least in part on the equation 1 minus aggregated interference severity level.

6. The tangible computer readable media of claim 1 wherein the software further comprises computer-readable instructions operable, when executed, to cause the one or more processors to:
compute an interference severity level of each channel of a plurality of channels relative to the access point; and
aggregate the computed interference severity levels of the plurality of channels relative to the access point.

7. The tangible computer readable media of claim 1 wherein the software further comprises computer-readable instructions operable, when executed, to cause the one or more processors to:
compute an interference severity level of each channel of a plurality of channels relative to a plurality of access point;
aggregate, across one or more floors, the computed interference severity levels of the plurality of channels; and
compute an air quality metric for the one or more floors, wherein the air quality metric is based at least in part on the equation 1 minus aggregated interference severity level.

8. The tangible computer readable media of claim 1 wherein the software further comprises computer-readable instructions operable, when executed, to cause the one or more processors to:
compute an interference severity level of each channel of a plurality of channels relative to a plurality of access point;
aggregate, across one or more floors, the computed interference severity levels of the plurality of channels;
aggregate, across a one or more buildings, the computed aggregation interference severity levels of the plurality of channels across the one or more floors; and
compute an air quality metric for the one or more buildings, wherein the air quality metric is based at least in part on the equation 1 minus aggregated interference severity level.

9. The tangible computer readable media of claim 1 wherein the software further comprises computer-readable instructions operable, when executed, to cause the one or more processors to:
compute an interference severity level of each channel of a plurality of channels relative to a plurality of access point;
aggregate, across one or more floors, the computed interference severity levels of the plurality of channels;
aggregate, across a one or more buildings, the computed aggregation interference severity levels of the plurality of channels across the one or more floors;
aggregate, across one or more campuses, the computed aggregation interference severity levels of the plurality of channels across the one or more buildings; and
compute an air quality metric for the one or more campuses, wherein the air quality metric is based at least in part on the equation 1 minus aggregated interference severity level.

10. One or more tangible computer readable media encoded with software, the software comprising computer-readable instructions operable, when executed, to cause one or more processors to:
determine a target area for computing a target air quality metric;
compute an interference severity level for a plurality of interference sources detected at an access point;
aggregate two or more of the computed interference severity levels relative to the access point;
compute an air quality metric for each access point in the target area, wherein the air quality metric is based at least in part on the equation 1 minus aggregated interference severity level, wherein the air quality metric is based on an aggregation of the computed interference severity levels; and aggregate the computed air quality metrics relative to the access points, wherein the target air quality metric is based on an aggregation of the computed air quality metrics.

11. The tangible computer readable media of claim 10 wherein the target area is defined by one or more floors.

12. The tangible computer readable media of claim 10 wherein the target area is defined by one or more buildings.

13. The tangible computer readable media of claim 10 wherein the target area is defined by one or more campuses.

14. A method comprising:
computing, by a server, an interference severity level for a plurality of interference sources detected at an access point;
aggregating, by the server, one or more of the computed interference severity levels relative to the access point; and
computing, by the server, an air quality metric for the access point, wherein the air quality metric based at least in part on an equation 1 minus aggregated interference severity level.

15. The method of claim 14 further comprising computing an interference severity level of an operating channel relative to the access point.

16. The method of claim 14 further comprising:
computing an interference severity level of an operating channel relative to each access point of a plurality of access points;
aggregating, across one or more floors, the computed interference severity levels of the operating channels; and
computing an air quality metric for the one or more floors, wherein the air quality metric is based at least in part on the equation 1 minus aggregated interference severity level.

17. The method of claim 14 further comprising:
computing an interference severity level of an operating channel relative to each access point of a plurality of access points;
aggregating, across one or more floors, the computed interference severity levels of the operating channels;
aggregating, across one or more buildings, the computed aggregation interference severity levels of the operating channels across the one or more floors; and
computing an air quality metric for the one or more buildings, wherein the air quality metric is based at least in part on the equation 1 minus aggregated interference severity level.

18. The method of claim 14 further comprising:
computing an interference severity level of an operating channel relative to each access point of a plurality of access points;
aggregating, across one or more floors, the computed interference severity levels of the operating channels;
aggregating, across one or more buildings, the computed aggregation interference severity levels of the operating channels across the one or more floors;
aggregating, across one or more campuses, the computed aggregation interference severity levels of the operating channels across the one or more buildings; and
computing an air quality metric for the one or more campuses, wherein the air quality metric is based at least in part on the equation 1 minus aggregated interference severity level.

19. The method of claim 14 further comprising:
computing an interference severity level of each channel of a plurality of channels relative to the access point; and
aggregating the computed interference severity levels of the plurality of channels relative to the access point.

20. The method of claim 14 further comprising:
computing an interference severity level of each channel of a plurality of channels relative to a plurality of access point;
aggregating, across one or more floors, the computed interference severity levels of the plurality of channels; and
computing an air quality metric for the one or more floors, wherein the air quality metric is based at least in part on the equation 1 minus aggregated interference severity level.

21. The method of claim 14 further comprising:
computing an interference severity level of each channel of a plurality of channels relative to a plurality of access point;
aggregating, across one or more floors, the computed interference severity levels of the plurality of channels;
aggregating, across a one or more buildings, the computed aggregation interference severity levels of the plurality of channels across the one or more floors; and
computing an air quality metric for the one or more buildings, wherein the air quality metric is based at least in part on the equation 1 minus aggregated interference severity level.

22. The method of claim 14 further comprising:
computing an interference severity level of each channel of a plurality of channels relative to a plurality of access point;
aggregating, across one or more floors, the computed interference severity levels of the plurality of channels;
aggregating, across a one or more buildings, the computed aggregation interference severity levels of the plurality of channels across the one or more floors;
aggregating, across one or more campuses, the computed aggregation interference severity levels of the plurality of channels across the one or more buildings; and
computing an air quality metric for the one or more campuses, wherein the air quality metric is based at least in part on the equation 1 minus aggregated interference severity level.

23. An apparatus comprising:
one or more processors;
a memory;
a network interface; and
the one or more processors and the apparatus executing a management application to:
compute an interference severity level for a plurality of interference sources detected at an access point;
aggregate one or more of the computed interference severity levels relative to the access point; and
compute an air quality metric for the access point, wherein the air quality metric based at least in part on an equation 1 minus aggregated interference severity level.

24. The apparatus of claim 23 wherein management application is further operable to cause the one or more processors and the apparatus to compute an interference severity level of an operating channel relative to the access point.

25. The apparatus of claim 23 wherein the management application is further operable to cause the one or more processors and the apparatus to:
compute an interference severity level of an operating channel relative to each access point of a plurality of access points;
aggregate, across one or more floors, the computed interference severity levels of the operating channels; and compute an air quality metric for the one or more floors, wherein the air quality metric is based at least in part on the equation 1 minus aggregated interference severity level.

26. The apparatus of claim 23 wherein the management application is further operable to cause the one or more processors and the apparatus to:
compute an interference severity level of an operating channel relative to each access point of a plurality of access points;
aggregate, across one or more floors, the computed interference severity levels of the operating channels;
aggregate, across one or more buildings, the computed aggregation interference severity levels of the operating channels across the one or more floors; and
compute an air quality metric for the one or more buildings, wherein the air quality metric is based at least in part on the equation 1 minus aggregated interference severity level.

27. The apparatus of claim 23 wherein the management application is further operable to cause the one or more processors and the apparatus to:
compute an interference severity level of an operating channel relative to each access point of a plurality of access points;
aggregate, across one or more floors, the computed interference severity levels of the operating channels;
aggregate, across one or more buildings, the computed aggregation interference severity levels of the operating channels across the one or more floors;
aggregate, across one or more campuses, the computed aggregation interference severity levels of the operating channels across the one or more buildings; and
compute an air quality metric for the one or more campuses, wherein the air quality metric is based at least in part on the equation 1 minus aggregated interference severity level.

28. The apparatus of claim 23 wherein the management application is further operable to cause the one or more processors and the apparatus to:
compute an interference severity level of each channel of a plurality of channels relative to the access point; and
aggregate the computed interference severity levels of the plurality of channels relative to the access point.

29. The apparatus of claim 23 wherein the management application is further operable to cause the one or more processors and the apparatus to:
compute an interference severity level of each channel of a plurality of channels relative to a plurality of access point;
aggregate, across one or more floors, the computed interference severity levels of the plurality of channels; and
compute an air quality metric for the one or more floors, wherein the air quality metric is based at least in part on the equation 1 minus aggregated interference severity level.

30. The apparatus of claim 23 wherein the management application is further operable to cause the one or more processors and the apparatus to:
compute an interference severity level of each channel of a plurality of channels relative to a plurality of access point;
aggregate, across one or more floors, the computed interference severity levels of the plurality of channels;
aggregate, across a one or more buildings, the computed aggregation interference severity levels of the plurality of channels across the one or more floors; and
compute an air quality metric for the one or more buildings, wherein the air quality metric is based at least in part on the equation 1 minus aggregated interference severity level.

31. The apparatus of claim 23 wherein the management application is further operable to cause the one or more processors and the apparatus to:
compute an interference severity level of each channel of a plurality of channels relative to a plurality of access point;
aggregate, across one or more floors, the computed interference severity levels of the plurality of channels;
aggregate, across a one or more buildings, the computed aggregation interference severity levels of the plurality of channels across the one or more floors;
aggregate, across one or more campuses, the computed aggregation interference severity levels of the plurality of channels across the one or more buildings; and
compute an air quality metric for the one or more campuses, wherein the air quality metric is based at least in part on the equation 1 minus aggregated interference severity level.

\* \* \* \* \*

UNITED STATES PATENT AND TRADEMARK OFFICE
CERTIFICATE OF CORRECTION

PATENT NO. : 7,596,461 B2  Page 1 of 1
APPLICATION NO. : 11/774362
DATED : September 29, 2009
INVENTOR(S) : Brian Donald Hart et al.

It is certified that error appears in the above-identified patent and that said Letters Patent is hereby corrected as shown below:

On the title page item (75), should read:

--Inventors: Brian Donald Hart, Sunnyvale, CA (US); Christopher Sean Johnson, San Jose, CA (US); Igal Gutkin, Redwood City, CA (US); Sanjeev Hemantkumar Desai, Saratoga, CA (US)--

Signed and Sealed this

Tenth Day of November, 2009

David J. Kappos
*Director of the United States Patent and Trademark Office*